United States Patent [19]

Heinerman et al.

[11] Patent Number: 5,246,569
[45] Date of Patent: Sep. 21, 1993

[54] PROCESS FOR THE HYDRODESULFURIZATION OF LIGHT HYDROCARBON FEEDS

[75] Inventors: Jacobus J. L. Heinerman, PG Amsterdam; Antonius J. van Hengstum, GE Deventer; Menno de Mind, AB Amsterdam, all of Netherlands

[73] Assignee: Akzo N.V., Arnhem, Netherlands

[21] Appl. No.: 739,940

[22] Filed: Aug. 2, 1991

[30] Foreign Application Priority Data

Aug. 3, 1990 [NL] Netherlands ............ 9001762

[51] Int. Cl.$^5$ ............... C10G 45/08
[52] U.S. Cl. ............ 208/216 R; 208/216 PP
[58] Field of Search ............ 502/211; 208/216 R, 208/216 PP

[56] References Cited

U.S. PATENT DOCUMENTS

| | | | |
|---|---|---|---|
| 3,232,887 | 2/1966 | Pessimisis | 502/211 X |
| 3,749,664 | 7/1973 | Mickelson | 208/254 |
| 3,840,472 | 10/1974 | Colgan et al. | 252/435 |
| 4,014,821 | 3/1977 | Hamner | 208/216 R |
| 4,028,227 | 6/1977 | Gustafson | 208/216 |
| 4,154,812 | 5/1979 | Sanchez et al. | 423/616 |
| 4,392,985 | 7/1983 | Millman | 252/435 |
| 4,444,905 | 4/1984 | Pessimisis | 502/211 |
| 4,686,030 | 8/1987 | Ward | 208/216 |
| 4,716,141 | 12/1987 | Kemp | 502/211 |
| 4,879,265 | 11/1989 | Simpson et al. | 502/211 |
| 4,941,964 | 7/1990 | Dai et al. | 208/216 |

FOREIGN PATENT DOCUMENTS

| | | |
|---|---|---|
| 0164162 | 12/1985 | European Pat. Off. . |
| 0244106 | 11/1987 | European Pat. Off. . |
| 0126250 | 12/1987 | European Pat. Off. . |
| 0112667 | 3/1988 | European Pat. Off. . |
| 0266009 | 5/1988 | European Pat. Off. . |
| 0309046 | 3/1989 | European Pat. Off. . |
| 2055602 | 3/1981 | United Kingdom . |

OTHER PUBLICATIONS

M. DeWind, et al. (Akzo Chemicals) "Upflow versus Downflow Testing of Hydrotreating Catalysts," Applied Catalysis vol. 43, pp. 239 ff (1988).
Arie de Bruijn, et al. (Akzo Chemie Nederland b.v.) "Effect of the Noncylindrical Shape of Extrudates on the Hydrodesulfurization of Oil Fractions," Ind. Eng. Chem Process Des. Dev. vol. 20, pp. 40 ff (1981).
Arie De Bruijn, "Testing of hds Catalysts in Small Trickle Phase Reactors" Proc. 6th Int. Congr. Catal. vol. 2, London 1976 (eds. G. C. Bond et al.), paper B34 (pp. 951-964.
Kirk-Othmer's "Encyclopedia of Chemical Technology," Third Ed., vol. 2, pp. 218-228 (John Wiley & Sons, N.Y. 1978).

*Primary Examiner*—W. J. Shine
*Attorney, Agent, or Firm*—James K. Poole; Louis A. Morris

[57] ABSTRACT

A process for the catalytic hydrodesulfurization of hydrocarbon-containing feeds using a catalyst of a phosphorus component, a cobalt component and a Group VIB metal component on an alumina carrier.

7 Claims, No Drawings

PROCESS FOR THE HYDRODESULFURIZATION OF LIGHT HYDROCARBON FEEDS

REFERENCES TO RELATED APPLICATIONS

The present application for patent is entitled to the benefit of an earlier filing date in a foreign country under 35 U.S.C. 119, based on priority application Ser. No. 9001762, The Netherlands, Aug. 3, 1990, which is hereby incorporated by reference.

BACKGROUND OF THE INVENTION

Field of the Invention

The invention relates to a catalyst composition suitable for hydrotreating, more particularly for hydrodesulphurizing hydrocarbon-containing feeds. The invention further relates to processes for the preparation and use of the catalyst composition.

Background of the Invention

In general, the object of catalytically hydrotreating hydrocarbon-containing feeds is the complete or partial removal of impurities. Common impurities are sulphur compounds and nitrogen compounds. The at least partial removal of such impurities from a feed will ensure that, when the final product is burned, fewer sulphur oxides and/or nitrogen oxides damaging to the environment will be released In addition, sulphur compounds and nitrogen compounds are toxic to many of the catalysts employed in the oil industry for converting feeds into ready-for-use products. Examples of such catalysts include cracking catalysts, hydrocracking catalysts, and reforming catalysts. It is therefore customary for feeds to be subjected to a catalytic hydrotreatment prior to their being processed in, say, a cracking unit. Catalytic hydrotreatment implies contacting a feed with hydrogen at elevated temperature and pressure in the presence of a hydrotreating catalyst. In this process the sulphur compounds and nitrogen compounds present in the feed are converted into readily removable hydrogen sulphide and ammonia.

In general, hydrotreating catalysts are composed of a carrier having deposited thereon a group VIB metal component and a group VIII metal component The most commonly employed group VIB metals are molybdenum and tungsten, while cobalt and nickel are the conventional group VIII metals. As a rule, such catalysts are prepared by impregnating a carrier with an aqueous solution of compounds of the metals in question, followed by a drying step and a calcination step. The impregnating solution will usually contain a phosphorus compound, such as phosphoric acid, to enhance the stability of the solution. See, e.g., U.S. Pat. No. 3,840,472, in which it is recommended to dissolve first particular nickel salts or cobalt salts and then molybdenum trioxide in aqueous phosphoric acid, such that specific concentrations of the three components in the final solution are obtained.

Over the years many different ways of improving the action of phosphorus-containing catalysts in hydrodesulphurizing processes have been proposed. See, e.g., U.S. Pat. No. 4,392,985 and European Patent Specification Nos. 0 126 250 and 0 112 667. U.S. Pat. No. 4,392,985 describes that it is advantageous to keep the pH of the impregnating solution at a value of less than 1.2. EP-B 0 126 250 and EP-B 0 112 667 look to the use of catalysts having a specific, narrow pore size distribution to obtain the improvement, with EP-B 0 112 667 furthermore proposing that the use of a group VIII metal be dispensed with. GB 2 055 602 describes catalysts having a comparatively high metals load, preference being given to nickel and molybdenum. The catalysts are prepared using a combination of multiple impregnating steps and a shaping step. This process is a highly specific one and inspired by the thought that "merely increasing the catalytic metals of any composition can eventually top out the activity effect and actually begin to give a decrease in activity at very high metals loadings."

Although more or less acceptable desulphurization results can be obtained using the catalysts disclosed so far, there is permanent need for improved catalysts on account of the requirements as to the legally permitted sulphur content in fuels becoming ever stricter. Equally, this need exists because at a given final sulphur content a more active catalyst will make it possible to operate under milder process conditions (energy saving) or to increase the life span of a catalyst prior to its needing regeneration (cycle length). Furthermore, this need exists because more and more additional demands are made on desulphurization catalysts with respect to their hydrodenitrogenation activity, their life cycle under mild hydrocracking conditions, and their capacity for producing the lowest possible olefin content in the end product (improving the colour, oxidation, and light stabilities).

SUMMARY OF THE INVENTION

The present invention has as its object the provision of a catalyst that will at least partially satisfy these requirements. It has been found that this object is attained by using a catalyst equipped with a comparatively high cobalt and group VIB metal load on the one hand and a comparatively low phosphorus load on the other. The catalyst according to the invention contains a porous, inorganic oxidic carrier, a phosphorus component, a cobalt component, and a Group VIB metal component, wherein, calculated on 100 g of the catalyst composition, the phosphorus component content, calculated as $P_2O_3$, is about 2 to 28 mmoles, the cobalt component content, calculated as CoO, is about 60 to 133 mmoles, and the group VIB metal component content, calculated as trioxide, is about 132 to 2os mmoles, the specific surface area of the catalyst composition is greater than about 100 $m^2g$, and the pore volume is in the range of about 0.25 to 1.3 ml/g. The catalyst preferably consists essentially of these named components.

DETAILED DESCRIPTION OF THE INVENTION

The catalyst according to the invention contains as carrier material a porous, inorganic oxide. As examples of suitable materials may be mentioned alumina, silica, magnesium oxide, zirconium oxide, titanium oxide, as well as combinations of two or more of these materials. Preference is given to alumina or alumina combined with silica, i.e., silica-alumina in which the amount of silica present may be up to 15 weight percent, preferably up to 10 weight percent, and more particularly up to 5 weight percent. Most preferred are the so-called transition phase aluminas (gamma, theta and delta aluminas), in combination with silica or not. Optimum results are obtained employing carriers containing at least 90 weight percent of transition alumina. Transition aluminas are disclosed in U.S. Pat. No. 4,154,812 and European Patent EP-B0126250, which are both incorporated herein by reference. Such materials are also described in Kirk-Othmer's ENCYCLOPEDIA OF CHEMICAL TECHNOLOGY, Third Ed., Vol. 2, pp. 218-228 (John Wiley & Sons, New York 1978), where the alternative terms "activated" or "active" alumina are used. This description is also incorporated herein by reference.

The phosphorus component content in the catalyst, calculated as $P_2O_5$, is in the range of from about 2 to about 28 mmoles, preferably 2 to 21 mmoles, calculated on 100 g of catalyst composition. In percentages by weight these amounts come to about 0.3 to 4 weight percent and about 0.3 to 3 weight percent, respectively. The cobalt component, calculated as CoO, is present in an amount in the range of from about 60 to about 133 mmoles, preferably about 60 to 93 mmoles, calculated on 100 g of catalyst composition. In percentages by weight these amounts are about 4.5 to 10 weight percent and about 4.5 to 7 weight percent, respectively. Especially suited for use are catalysts containing from about 4.5 to 6 weight percent of cobalt component. Preferred group VIB metals are molybdenum and tungsten, more particularly molybdenum. The group VIB metal component content, calculated as trioxide, is in the range of from about 132 to about 208 mmoles, preferably about 132 to 174 mmoles, calculated on 100 g of catalyst composition. For, say, molybdenum trioxide these amounts correspond to percentages by weight of about 19 to 30 weight percent and about 19 to 25 weight percent, respectively. Preeminently suited to be used are catalysts containing from about 19 to 23 weight percent of molybdenum trioxide. For optimum results it is advisable that the ratio of the number of gram atoms of phosphorus to the sum of the number of gram atoms of cobalt and group VIB metal should be in the range of from about 0.02 to about 0.25, preferably from about 0.02 to 0.2.

The catalyst should have a specific surface area of at least about 100 $m^2g$ (B.E.T. method) and a pore volume in the range of about 0.25 to 1.3 ml/g (mercury penetration method; angle of contact 140°). Preferably, the specific surface area is about 150 to 300 $m^2$ g and the pore volume is about 0.3 to 1 ml/g. Also preferably, the catalyst has a monomodal pore size distribution. The other pore characteristics of the catalyst may be selected as the feed to be treated requires. For many catalysts a suitable median pore diameter will be in the range of about 5 to 20 nm, preferably of 5 to 15 nm. The median pore diameter (MPD) is defined as follows: 50 percent of the pore volume is in pores having a greater diameter than the MPD and the other 50 percent is in pores having a smaller diameter than the MPD. Preferred catalysts contain less than 5 percent of their pore volume in pores having a diameter of greater than 25 nm. Still more preferred catalysts contain less than 5 percent of their pore volume in pores having a diameter of greater than 20 nm. Especially in the case of feeds substantially made up of components having a boiling point of 400° C or lower preference is given to the use of catalysts in which at least 50 percent of the pore volume is in pores having a diameter in the range of 7 to 9 nm (mercury penetration method).

The catalyst is employed in the conventional manner in the form of spheres or extrudates. Examples of suitable types of extrudates have been disclosed in the literature (see, e.g., U.S. Pat. No. 4,028,227). Highly suitable for use are cylindrical particles (which may be hollow or not) as well as symmetrical and asymmetrical polylobed particles (having 2, 3 or 4 lobes).

The preparation of catalysts according to the invention may be carried out in several manners, using techniques known in themselves. Suitable phosphorus component precursors include phosphoric acid and the various ammonium hydrogen phosphates. Suitable cobalt component precursors include cobalt nitrate and cobalt carbonate. Suitable group VIB metal component precursors include ammonium dimolybdate and ammonium heptamolybdate. Also suitable for use are the trioxides of the group VIB metals, such as molybdenum trioxide. These and other P-, cobalt-, or group VIB metal-containing compounds are known to the person skilled in the art and will be referred to hereinafter as component precursors (this also applies to a compound such as molybdenum trioxide). One suitable method of preparing a catalyst according to the invention is by starting from the carrier in the preformed condition, such as an extrudate, using an aqueous solution of the component precursors in question to deposit thereon suitable amounts of said precursors, e.g. by means of impregnation, and then, after an optional drying step at a temperature in the range of from about 25° to about 200° C., calcining the resulting material at a temperature in the range of from about 350° to about 750° C. to at any rate convert the phosphorus component and metal component precursors to the desired oxide form.

It will be clear to the person skilled in the art that there can be a wide number of variations on this method. Thus, it is possible to apply a plurality of impregnating steps, the impregnating solutions to be used containing one or more of the component precursors that are to be deposited, or a portion thereof. Instead of impregnating techniques there can be used dipping methods, spraying methods, etc. With multiple impregnation, dipping, etc. drying and/or calcining may be carried out in between. Alternatively, one or more component precursors can be mixed wholly or in part with the carrier prior to the shaping step being carried out. In such an embodiment the component precursor material, or a portion thereof, can be deposited on the unshaped carrier material, say, a powder, by means of, e.g., impregnation, after which the shaping step is carried out. Alternatively, it is possible to intimately mix one or more component precursors wholly or in part with the carrier material during the shaping step rather than prior to it. Techniques that are suitable for this process are co-pelletization and co-extrusion. It is recommended that the group VIB metal component precursor employed in this process be molybdenum trioxide.

Optimum results are obtained when care is taken to preclude any or virtually any reaction between the cobalt component precursor and the carrier material. Such a reaction will reduce the amount of cobalt that is effectively available for catalytic ends in the final catalyst. Notably, when use is made of alumina-containing carriers the prospect of compounds or complexes containing cobalt and aluminum being formed is undesirable. Such a reaction can occur when the cobalt component precursor is contacted with precursors of transition aluminas, such as boehmite, with subsequent calcining to form the transition alumina. It is therefore recommended to first subject the transition alumina precursor to a shaping step, e.g. extrusion, and to subject the resulting carrier to at least one calcining step, in order to obtain the transition alumina prior to the carrier being provided with the cobalt component precursor. During this calcination process, which is generally carried out at a temperature in the range of about 400° to 1000° C. over a period of 0.5 to 16 hours, in the presence of steam or not, the transition alumina precursor is converted into a transition alumina. For an example of the preparation of a suitable alumina carrier, including the preparation of the transition alumina precursor (alpha-alumina monohydrate) reference is made to U.S. Pat. No. 4,154,812.

As described above, to prepare the catalysts of the invention containing transition alumina(s), one can add the precursors of phosphorus and the metals (Co and/or Mo) before, during and/or after the shaping of the chemical precursor(s) of the transition alumina, except that the cobalt precursor must be deposited after the formation of the transition alumina (i.e., after calcining).

As indicated hereinbefore, to deposit the component precursors on the carriers use is generally made of one or more solutions of the component precursors in water. It has been found that the effectiveness of the final catalyst can be further enhanced when the aqueous solutions also contain a compound selected from the group consisting of nitric acid, formic acid, acetic acid, and polycarboxylic acids such as nitrilotriacetic acid, citric acid, and ethylenediaminetetraacetic acid. Alternatively, salts and combinations of these compounds can be used. The appropriate amount depends upon such factors as the nature of the component precursor(s) and the precursor concentration(s) and is simple to determine experimentally.

Like the prior art hydrodesulphurization catalysts, the catalysts according to the invention are generally employed in the sulphided form. To this end use may be made of ex-situ as well as in-situ (pre)sulphidation techniques. Such methods are well known in the art.

The present catalysts can be used to hydrodesulphurize a wide range of feeds. Examples of suitable feeds include middle distillates, kerosene, naphtha, vacuum gas oils, and heavy gas oils, more generally, hydrocarbon-containing feeds having a metals content (Ni+V) not exceeding 15 ppm, which feeds are substantially (>50% by volume) composed of components having a boiling point below 600° C., preferably below 400° C. The conventional process conditions, such as temperatures in the range of about 250° to 450° C., pressures in the range of 5 to 250 bar, space velocities in the range of 0.1 to 10 hr-1, and $H_2$/oil ratios in the range of about 50 to 2,000 Nl/l, can be applied here. The present catalysts not only have an excellent desulphurization capacity, they can also effectively reduce the feed's olefin content (reduction of the bromine number), thus favorably affecting the obtained product's colour, light, and oxidation stabilities.

EXAMPLES

The invention will be illustrated with reference to the non-limiting examples below.

EXAMPLE 1

Preparation of a Catalyst According to the Invention

First, an impregnating solution was prepared. To 3 l of water of 40° C. there were added successively, with stirring, 1.18 kg of cobalt carbonate and 0.45 kg of aqueous phosphoric acid (85%). The suspension had its temperature increased to and kept for 1 hour at 60° C., after which 2.74 kg of molybdenum trioxide were added. The temperature was then increased to and kept for two hours at 96.C, whereupon 476 g of aqueous nitric acid (65%) were added, after which a clear, stable, reddish-brown solution was obtained. The total volume of the solution was increased to 6.5 l by the addition of water, and then the solution was cooled to room temperature.

Next, 10 kg of γ-alumina (asymmetrical quadrulobe extrudates, 1.2 mm (short diameter)×1.4 mm (long diameter); PV($H_2O$): 0.65 ml/g) were impregnated with the above-described solution. The impregnated material was allowed to age for 0.5 hours and then dried at 120° C., first for 1.5 hours in a rotating impregnator and then on a sheet for 24 hours. Finally, the dried material was calcined for 1.5 hours at 530° C. in an air atmosphere. The catalyst had a $P_2O_5$ content of 2.0 weight percent, an $MoO_3$ content of 20.8 weight percent, and a CoO content of 5.1 weight percent. The pore volume was 0.41 ml/g (mercury penetration method), the surface area 207 m²g, and the median pore diameter 8.0 nm (mercury penetration method).

EXAMPLES 2 TO 11

Examples 2 to 11 below describe the preparation of four catalysts according to the invention (Examples 2-5) and six catalysts for comparative ends (Comparative examples 6-11). Example 12 describes how the catalysts of Examples 1-11 were tested and also lists the results.

In preparing the present catalysts use was made of a carrier in the form of asymmetrical quadrulobe extrudates [1.2 mm (short diameter)×1.4 mm (long diameter)] made up of 98.7 weight percent of γ-alumina and 0.7 weight percent of silica, having a surface area of 290 m²/g, and a pore structure such that the pore volume (Hg) in pores having a greater diameter than 4.2 nm was 0.58 ml/g and the median pore diameter 6.7 nm (mercury penetration method). All experimental procedures (preparing the impregnating solutions, the impregnations, dryings, and calcinations) were carried out as set down in Example 1, unless otherwise indicated.

EXAMPLE 2

500 g of carrier were impregnated with 325 ml of an aqueous solution containing 137 g of molybdenum trioxide, 59.2 g of cobalt carbonate, 22.2 g of phosphoric acid (85%), and 34 g of nitric acid (65%). The impregnating solution was prepared as described in Example 1, except that the order in which the molybdenum trioxide and the cobalt carbonate were added was reversed. The composition and properties of the catalyst obtained after drying and calcination were as listed in Table I below.

EXAMPLE 3

350 g of carrier were impregnated with 230 ml of an aqueous solution containing 94 g of molybdenum trioxide, 40.6 g of cobalt carbonate, 3.8 g of phosphoric acid (85%), 29.4 g of nitric acid (65%), and 16 g of citric acid. The impregnating solution was prepared as described in Example 1, except that after the nitric acid citric acid was added. The composition and properties of the catalyst obtained after drying and calcination were as listed in Table I below.

EXAMPLE 4

1,500 g of carrier were impregnated with 1,000 ml of an aqueous solution containing 405.3 g of molybdenum trioxide, 175.2 g of cobalt carbonate, 33 g of phosphoric acid (85%), and 142.8 g of nitric acid (65%). The composition and properties of the catalyst obtained after drying and calcination were as listed in Table I below.

EXAMPLE 5

1,000 g of carrier were impregnated with 650 ml of an aqueous solution containing 352.9 g of molybdenum trioxide, 116.0 g of Cobalt carbonate, 72.4 g of phosphoric acid (85%), and 35 g of nitric acid (65%). The composition and properties of the catalyst obtained after drying and calcination were as listed in Table I below.

COMPARATIVE EXAMPLE 6

500 g of carrier were impregnated with 325 ml of an aqueous solution containing 120 g of molybdenum trioxide, 57.6 g of cobalt carbonate, 21.7 g of phosphoric acid (85%), and 25 g of nitric acid (65%). The composition and properties of the catalyst obtained after drying and calcination were as listed in Table I below.

COMPARATIVE EXAMPLE 7

500 g of carrier were impregnated with 325 ml of an aqueous solution containing 134.2 g of molybdenum trioxide, 45.3 g of cobalt carbonate, 33.9 g of phosphoric acid (85%), and 26 g of nitric acid (65%). The composition and properties of the catalyst obtained after drying and calcination were as listed in Table I below.

COMPARATIVE EXAMPLE 8

500 g of carrier were first impregnated with 325 ml of an aqueous solution containing 104.7 g of ammonium dimolybdate (a solution obtained by simply dissolving the ammonium dimolybdate in water). The material obtained after drying and calcination (563.4 g) was impregnated with 325 ml of an aqueous solution containing 155.8 g of molybdenum trioxide, 66.9 g of cobalt carbonate, 25.2 g of phosphoric acid (85%), and 30 g of nitric acid (65%). The composition and properties of the catalyst obtained after drying and calcination were as listed in Table I below.

COMPARATIVE EXAMPLE 9

500 g of carrier were first impregnated with 325 ml of an aqueous solution containing 149.2 g of molybdenum trioxide, 64.5 g of cobalt carbonate, 24.1 g of phosphoric acid (85%), and 20 g of nitric acid (65%). The material obtained after drying and calcination (563.4 g) was subsequently impregnated with 325 ml of an aqueous solution containing 168.5 g of cobalt nitrate.6H$_2$O (a solution obtained by simply dissolving the cobalt nitrate in water). The composition and properties of the catalyst obtained after drying and calcination were as listed in Table I below.

COMPARATIVE EXAMPLE 10

500 g of carrier were impregnated with 325 ml of an aqueous solution containing 142.9 g of molybdenum trioxide, 61.7 g of cobalt carbonate, 58 g of phosphoric acid (85%), and 27 g of nitric acid (65%). The composition and properties of the catalyst obtained after drying and calcination were as listed in Table I below.

COMPARATIVE EXAMPLE 11

500 g of carrier were first impregnated with 325 ml of an aqueous solution containing 157.8 g of ammonium dimolybdate and 2.2 g of phosphoric acid (85%). The material obtained after drying and calcination (618 g) was impregnated with 325 ml of an aqueous solution containing 126.6 g of cobalt nitrate.6H$_2$O. The composition and properties of the catalyst obtained after drying and calcination were as listed in Table I below. The two impregnating solutions used in this example were prepared by simply dissolving the components in question in water.

EXAMPLE 12

The catalysts were compared with each other with respect to their desulphurization capacity. The techniques and equipment used in this process have been described in detail in *Applied Catalysis* Vol. 43, pp. 239 ff (1988); *Ind. Eng. Chem. Process Des. Dev.* Vol. 20, pp. 40 ff (1981); and *Proc. 6th Int. Congr. Catal.* Vol. 2, London 1976 (eds. G. C. Bond et al.), paper B34. The procedure was as follows.

Use was made of a Kuwait Straight Run Gas Oil having the following specification:

| | |
|---|---|
| density at 50° C.: | 0.8145 g/ml |
| sulphur content: | 1.175 weight percent (S) |
| nitrogen content: | 92 ppm (N) |
| ASTM D86 distillation data: | |
| IBP: | 177° C. |
| 50 vol. %: | 288° C. |
| FBP: | 365° C. |

The catalyst was charged to a reactor and first sulphided. To this end the gas oil, into which 2.5 weight percent of dimethyl disulphide (spiking agent) had been incorporated, was passed through the catalyst bed for 3 hours at a temperature of 100° C., a pressure of 30 bar (no H$_2$ flow), and an LHSV of 4.0 hr$^{-1}$ (pre-wetting), after which over a period of 8 hours the temperature was gradually increased to 320° C. During this increase in temperature the LHSV was 1.0 hr$^{-1}$, the pressure continued to be 30 bar, and an H$_2$ flow was started up: H$_2$/oil ratio 120 Nl/l. The situation at 320° C. was maintained for 10 hours, after which the sulphidation process was completed. Next, the spiked gas oil was replaced with the gas oil itself and the following test conditions were successively imposed:

| Test condition | LHSV hr$^{-1}$ | H$_2$/Oil Nl/l | Pressure bar | Temperature °C. |
|---|---|---|---|---|
| 1 | 3.00 | 120 | 30 | 335 |
| 2 | 2.00 | 120 | 30 | 335 |

After dissolved H$_2$S and NH$_3$ had been removed from the product streams (by passage of N$_2$), the sulphur contents of the products were determined by means of X-ray fluorescence spectroscopy (XRF) in accordance with ASTM D2622. The data obtained were used to calculate the relative volume activity (RVA), with test results obtained with the same volume of a commercially available HDS catalyst (KF-742 ® ex Akzo Chemicals; chemical composition: 15.0 weight percent of MoO$_3$, 4.0 weight percent of CoO, alumina carrier; SA: 270 m$^2$/g; PV(Hg): 0.52 ml/g; MPD: 8.0 nm) being employed as a reference.

First, the reaction speed constant k was calculated:

$$k = \frac{LHSV}{n-1} \times [(1/Sprod)^{n-1} - (1/Sfeed)^{n-1}]$$

where Sprod is the sulphur content of the product and Sfeed is the sulphur content of the feed, each expressed in weight percent.

The reaction order n was determined by means of iteration, k having the same value under the two test conditions. In order to compensate for differences in n for the various catalysts the LHSV for 92 percent HDS conversion was calculated:

$$LHSV_{92} = k \times \frac{n-1}{(1/0.08 Sfeed)^{n-1} - (1/Sfeed)^{n-1}}$$

$$RVA = \frac{LHSV_{92}}{LHSV_{92(ref)}} \times 100$$

The results are listed in Table I below. They show that the catalysts according to the invention were substantially more active than the comparative catalyst.

TABLE I

| | Catalyst properties | | | | | | |
|---|---|---|---|---|---|---|---|
| | per 100 g of composition | | | | | | |
| Example | MoO$_3$ mmole (wt. %) | CoO mmole (wt. %) | P$_2$O$_5$ mmole (wt. %) | SA m/g | PV ml/g | MPD nm | % PV > 20 nm$_d$ | RVA |
| 1 | 144 (20.8) | 68 (5.1) | 14 (2.0) | 207 | 0.41 | 8.0 | 2.9 | 126 |
| 2 | 142 (20.5) | 68 (5.1) | 13 (1.9) | 193 | 0.40 | 8.2 | 2.6 | 123 |
| 3 | 147 (21.2) | 67 (5.0) | 3.3 (0.47) | 235 | 0.42 | 7.6 | 4.3 | 126 |
| 4 | 143 (20.6) | 67 (5.0) | 7 (1.0) | 210 | 0.41 | 8.2 | 3.3 | 130 |
| 5 | 171 (24.6) | 67 (5.0) | 21 (3.0) | 169 | 0.37 | 8.2 | 1.9 | 118 |
| 6* | 124 (17.8) | 65 (4.9) | 13 (1.8) | 206 | 0.43 | 8.0 | 3.0 | 99 |
| 7* | 144 (20.7) | 53 (4.0) | 21 (3.0) | 201 | 0.41 | 8.0 | ** | 99 |
| 8* | 212 (30.6) | 68 (5.1) | 15 (2.1) | 143 | 0.31 | 7.6 | 3.3 | 97 |
| 9* | 127 (18.3) | 148 (11.1) | 15 (2.1) | 185 | 0.37 | 7.6 | 4.2 | 83 |
| 10* | 144 (20.7) | 68 (5.1) | 33 (4.7) | 193 | 0.39 | 7.4 | ** | 103 |
| 11* | 137 (19.7) | 68 (5.1) | 1.4 (0.2) | 217 | 0.42 | 7.8 | 4.0 | 89 |

*comparative example
**not available

SA = Specific Surface area, PV = Pore volume, MPD = Median Pore Diameter (as referred to on page 5 lines 32 to 35), RVA = Relative Volume Activity (as referred on page 18, lines 22 to 24 and page 16, line 7) and %PV > 20 nm$_d$ means the percentage of the pore volume in pores having diameters greater than 20 nm.

EXAMPLE 13

This Example illustrates the effectiveness of the catalysts according to the invention in deep hydrodesulphurization. The catalyst of Example 2 was compared with the commercially available KF-742 ® HDS catalyst mentioned in Example 12. The test procedure was the same as that described in Example 12, except for the feedstock and the test conditions. The feedstock was a partially desulphurized Kuwait Straight Run Gas Oil having a density at 50° C. of 0.8081 and a sulphur content of 0.165 weight percent. The test conditions were as follows:

| Test condition | LHSV hr$^{-1}$ | H$_2$/Oil Nl/l | Pressure bar | Temperature °C. |
|---|---|---|---|---|
| 1 | 1.5 | 120 | 30 | 375 |
| 2 | 3.0 | 120 | 30 | 375 |

After dissolved H$_2$S and NH$_3$ had been removed from the product streams, the sulphur contents of the products were determined by means of XRF in accordance with ASTM D2622. The data obtained was used to calculate the relative volume activity (RVA) in the same manner as described in Example 12, albeit that to compensate for differences in reaction order n for the two catalysts the LHSV in this case was calculated at a constant conversion for 98 percent HDS. It was found that the RVA, being equal to $$\frac{LHSV_{98}}{LHSV_{98(ref)}} \times 100,$$

was 161.

We claim:

1. A process for the catalytic hydrodesulphurization of hydrocarbon-containing feeds having a metals content of Ni plus V not exceeding 15 ppm and a boiling point range wherein more than 50 volume percent of the feed boils below 600° C., comprising contacting said feeds under hydrodesulphurization conditions with a catalyst composition containing a porous inorganic oxide carrier comprising at least one transition alumina, a comparatively low proportion of a phosphorus component and comparatively high proportions of a cobalt component and a Group VIB metal component, wherein said phosphorus component content, calculated as P$_2$O$_5$, is in the range of from about 2 to about 28 mmoles, said cobalt component content, calculated as CoO, is in the range of from about 60 to about 133 mmoles and said Group VIB metal component content, calculated as trioxide, is in the range of from about 132 to about 208 mmoles, all calculated on the basis of 100 grams of said catalyst composition.

2. The process of claim 1 wherein said catalyst composition has a specific surface area of at least about 100 m²/g and a pore volume in the range of from about 0.25 to about 1.3 ml/g.

3. The process of claim 2 wherein less than 5 percent of said catalyst's pore volume is contained in pores having a diameter of greater than 25 nm.

4. The process of claim 1 wherein said Group VIB metal is molybdenum.

5. The process of claim 4 wherein said catalyst composition contains from 19 to about 23 weight percent molybdenum, from 4.5 to about 6 weight percent cobalt and from 0.3 to about 3 weight percent phosphorus.

6. The process of claim 1 wherein the median pore diameter of said catalyst composition has a value in the range of from about 5 to about 15 nm.

7. The process of claim 1 wherein said catalyst composition is prepared by a process in which a chemical precursor of the transition alumina is shaped, the shaped material is subjected to at least one calcining step in order to form transition alumina, and the precursors of the phosphorus component and the metal components are deposited on the carrier material prior to, during and/or after the shaping step, with the proviso that the cobalt component precursor is deposited after the forming of the transition alumina.

* * * * *